Sept. 27, 1955     I. RABINOWITZ     2,718,991
HAND OPERATED PRESSURE PACK MACHINE
Filed Aug. 6, 1954     3 Sheets-Sheet 1
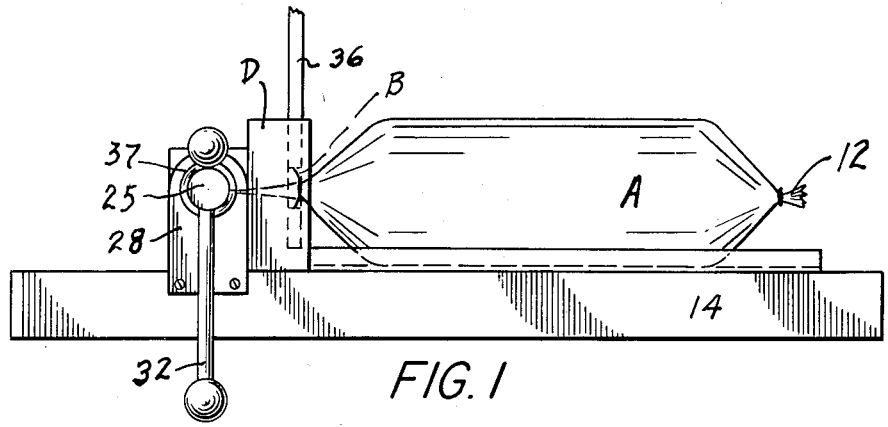
FIG. 1
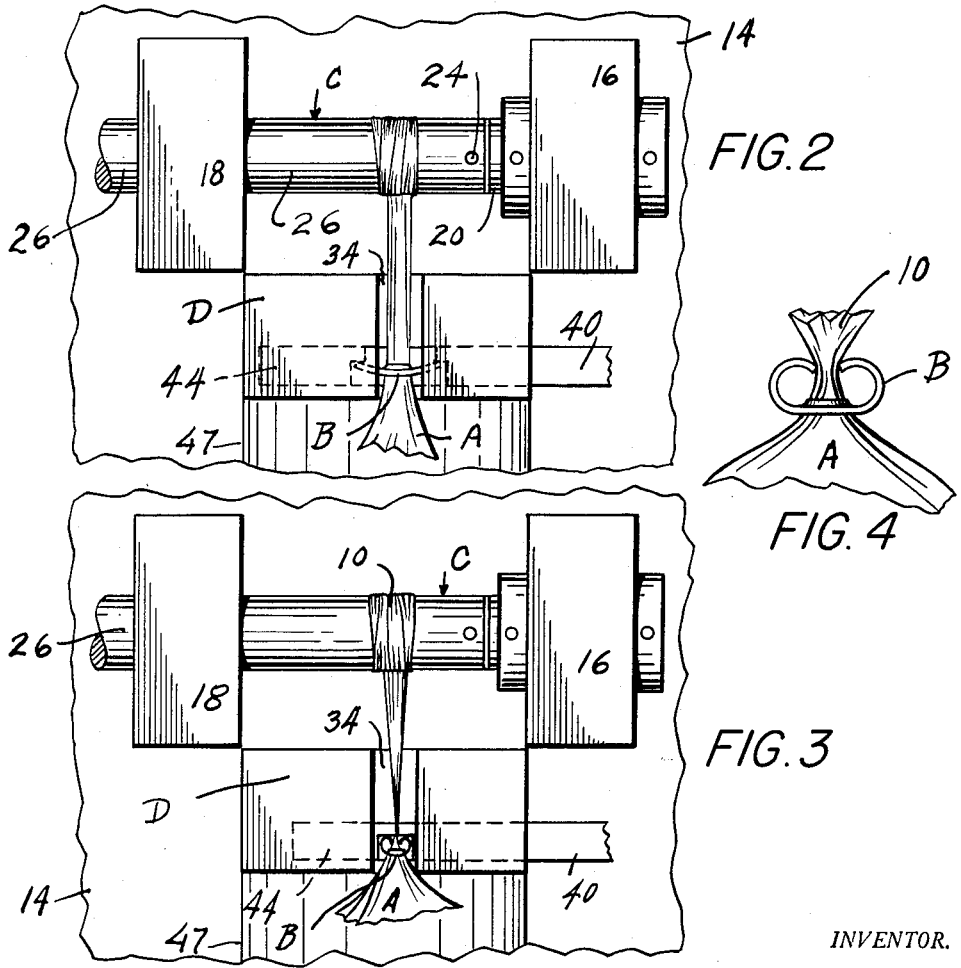
FIG. 2
FIG. 4
FIG. 3
INVENTOR.
IRVING RABINOWITZ
BY Harry Langsam
ATTORNEY Sept. 27, 1955     I. RABINOWITZ     2,718,991
HAND OPERATED PRESSURE PACK MACHINE
Filed Aug. 6, 1954     3 Sheets-Sheet 2
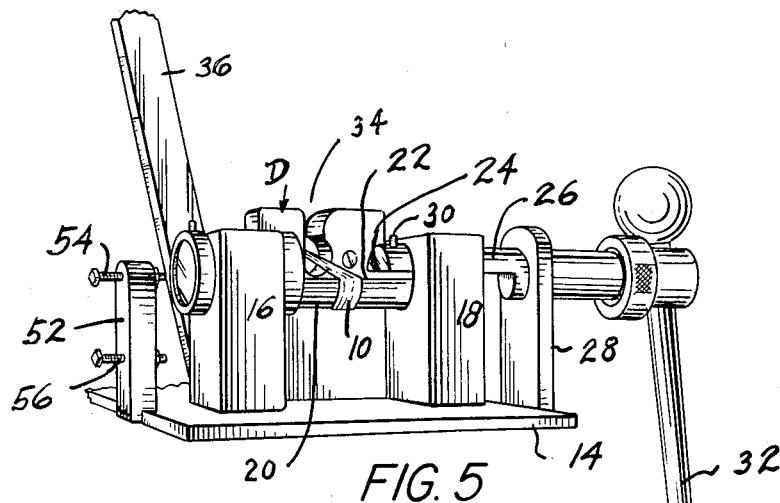
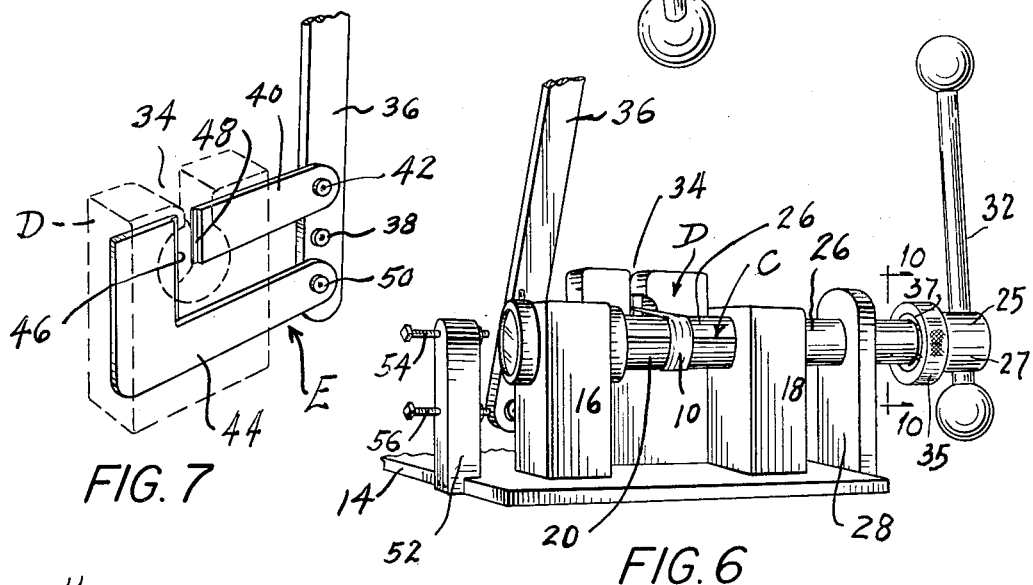
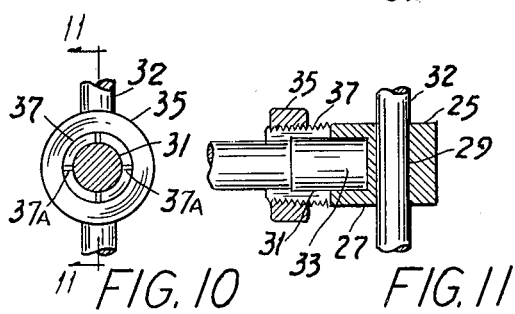
INVENTOR.
IRVING RABINOWITZ
BY Harry Sangsam
ATTORNEY Sept. 27, 1955     I. RABINOWITZ     2,718,991

HAND OPERATED PRESSURE PACK MACHINE

Filed Aug. 6, 1954     3 Sheets-Sheet 3

*INVENTOR.*
IRVING RABINOWITZ
BY Harry Langsam
ATTORNEY

United States Patent Office 2,718,991
Patented Sept. 27, 1955

2,718,991

HAND OPERATED PRESSURE PACK MACHINE

Irving Rabinowitz, Philadelphia, Pa.

Application August 6, 1954, Serial No. 448,325

5 Claims. (Cl. 226—56)

My invention relates to a machine for pressure packing edible substances, such as sausages, hams, and other edibles, into a flexible housing. In my prior Patent No. 2,685,394, I have disclosed a machine for pressure packing edibles. The present invention is an improvement on my aforementioned patent, and also on my prior filed patent application Ser. No. 294,240, filed June 18, 1952.

The present invention relates to a hand actuated pressure packing machine.

It is, therefore, an object of my invention to provide a hand packing machine which will pressure pack the contents of the machine, and also provide a sealing unit after the edible is pressure packed within a casing.

Another object of my invention is to provide a pressure packing machine which is simple and sturdy in construction, and wherein one end of the casing is usually held.

Another object of my invention is to provide a hand actuated pressure packing machine wherein the same turning member serves to hold one end of the casing.

Another object of my invention is to provide a pair of jaws for holding one end of the casing wherein one jaw is adapted to rotate and the other jaw overlaps the first named jaw to lock the casing in position and the second complementary jaw may slide into full overlapping position or in partial overlapping position to the other jaw and wherein the rotation of one jaw rotates the complementary jaw.

Another object of my invention is to provide a clutch on the driving means for the jaws of the machine so that variable tension can be applied between the driving means and the jaws of the machine and thereby prevent rupturing of the casing enclosing the edible product.

Another object of my invention is to provide a rapid method and machine for binding a casing holding a boneless ham or Canadian bacon, or the like.

Another object of my invention is to provide a machine wherein a boneless ham or the like may be compactly and rapidly compacted within a casing under high pressure into a roll.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawings, in which:

Fig. 1 is a side elevational view of a pressure packing machine embodying my invention with the casing in position.

Fig. 2 is a top view of the machine embodying my invention.

Fig. 3 is a view similar to Fig. 2, but wherein the perforated disc-like seal is closed upon the casing.

Fig. 4 is an enlarged view of the perforated disc-like seal securely attached to the casing.

Fig. 5 is a perspective view showing the hand operated pressure packing machine with the jaws for holding the casing open.

Fig. 6 is a perspective view similar to Fig. 5, but wherein the jaws are closed.

Fig. 7 is a perspective view of the seal holder.

Fig. 10 shows a sectional view of the clutch mechanism of my improved packing machine taken along line 10—10 of Fig. 6.

Fig. 11 is a sectional view of the clutch mechanism taken along line 11—11 of Fig. 10.

Figure 8:
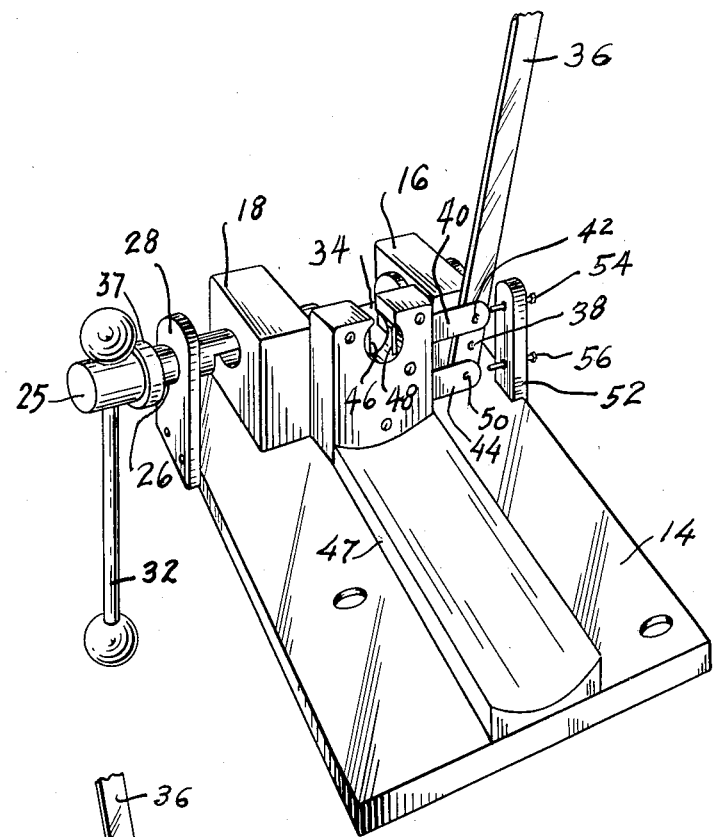
Fig. 8 is a perspective view showing the machine when it is viewed before the seal is compressed.

Referring now in greater detail to the drawings, wherein similar reference characters refer to similar parts, I show a casing, generally designated as A, which is made of cotton cellulose or other cellulose fiber material, wherein edible meats, boneless ham, boneless picnic, or Canadian bacon is held. The casing A is open at both ends, 10 and 12, and the meat is inserted through one of the open ends, the meat first having been cured by the usual types of fluid injection and soaking. One end 12 may be bound by a cord or by a seal, the other end 10 remaining open. A centrally perforated disc-like seal, generally designated as B, and which is described in detail in my patent application, Serial No. 294,240, now pending, is slipped over the open end 10 of the casing.

A machine, which is hand operated, pressure packs the contents of the casing A by pulling the casing through the opening in the seal B. The pressure packing machine comprises a base 14, upon which is mounted a pair of supports or stanchions 16, 18, and through the supports is a rotatable jaw, generally designated as C. The rotatable jaw is comprised of two elements. One is a pivoted member 20, which has a semi-cylindrical portion extending between the stanchions 16, 18 and it may be defined as one jaw.

The pivoted or rotatable jaw 20 has a semi-circular side or bounding surface, whose ends are joined by a flat or diametrical surface 22. Parallel to the flat surface 22 is another flat surface 24 which is on a complementary jaw 26, which is pivoted in a third stanchion 28 which is parallel to the stanchion 18. The jaw 26 is adapted to have the flat diametrical surfaces 22, 24 parallel to one another so that the rotation of one jaw rotates the jaws 20, 26 in unison. Furthermore, the jaw 26 is adapted to travel in a rectilinear direction in a longitudinal direction along the longitudinal axis of the jaw in order to load the casing in the jaws. A stanchion 28 serves as a pivot or the bearing for the jaw 26, and a pin 30 on the jaw 26 is adapted to abut against the stanchion 18 to prevent the jaw 26 from being pulled entirely out of the stanchions 18, 28 when one end 10 of the casing A is inserted between the jaws 20, 26. Both jaws may be rotated by turning the single jaw 26 by a handle or lever 32. In other words, the handle 32 can be rotated to rotate the jaws 20, 26 in unison, or the handle may pull the jaw 26 longitudinally so that one end of the casing can be removed or inserted. Conversely, only one end of the casing A is laid upon the flat surface 22 of jaw 20, then the second jaw 26 is shifted over the casing and the second jaw so that as the handle is rotated the casing is pulled through a horizontally positioned stanchion, generally designated as D.

Interposed between the handle 32 and the complementary jaw shaft 26 is an adjustable friction clutch 25. The clutch 25 is comprised of a body portion 27 through which a hole 29 provided for the handle 32, a laterally disposed hole 31 is provided in the body portion 27 of the clutch 25 to receive the enlarged end 33 of the complementary jaw shaft 26. The end of the clutch body portion 27 is provided with a tapered thread 37 and knurled nut 35. The tapered threaded end 27 of the body portion is slotted at 37A so that movement of the knurled nut 35 on the tapered threads causes the threaded end 37 of the body portion 27 to vary its grip on the complementary jaw shaft 26. This clutch arrangement is provided so that the clutch can be adjusted to prevent excessive tension on the casing end 10 and thus prevent rupturing of the casing.

Figure 9:
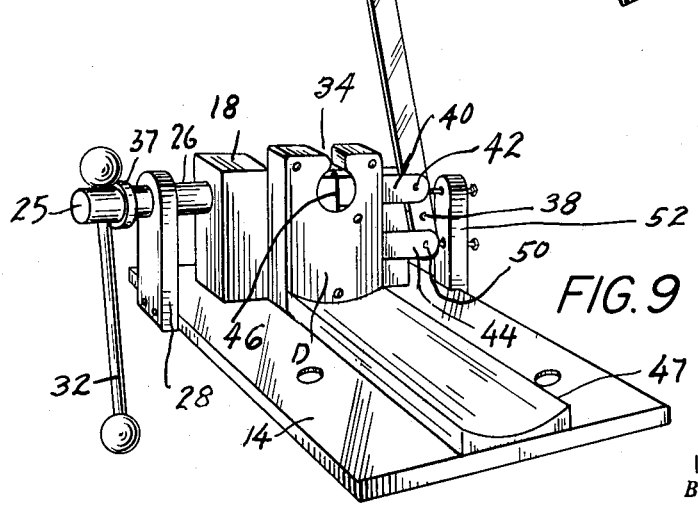
Fig. 9 shows a view wherein the seal is compressing about the casing.

The stanchion D is located to one end of the stanchions 16, 18, and it has a slot 34 at the upper portion thereof in order to permit a portion of the casing A down into the slot together with the disc-like member B through which the casing A is pervaded. The disc-like seal B is held into a seal holding and crimping vise, generally designated as E, see Fig. 7, and it comprises a lever 36 which is attached to a fixed pivot 38. A jaw 40 of the vise E is pivoted at 42 to the lever 36 and one end of the jaw projects within the slot 34, and a second L-shaped jaw 44 has an end 46 positioned within the slot 34 to complement the end 48 of the jaw 40. One end of the jaw 44 is pivoted at 50 to the lever 36 and, it should be noted, that the jaws 40 and 44 are pivoted to opposite sides of the fixed pivot 38. In other words, the seal clinching jaws 46, 48 extend within the slot 34, and movement of the lever arm 36 around the pivot 38 causes the pivot 42 to move the lever 40 and the pivot 50 on the lever 36 to actuate the L-shaped lever 44. It should be seen that movement of the lever from right to left, as illustrated in Figs. 8 and 9, causes the jaws to compress the seal, and when the jaws are compressed it compresses the seal B to lock upon the casing A.

The pivot 38 may be attached to the stanchion 16 or to the base 14.

Another stanchion 52 adjacent the seal compressing lever 36 has two adjustable screws 54, 56 which limits the throw or arc of movement of the lever 36.

A trough unit 47 is provided to definitely position the casing containing the edible product in line with the sealing means as above described. The trough is arranged to rest on the base 14, of the machine, with its end abutting the seal holding and crimping vise E.

My invention operates as follows:

A picnic ham in a casing A has one end 12 sealed and a seal B has the other end 10 of the casing pervaded therethrough. The end 10 is laid between the jaws 20, 26 as in Fig. 5. The seal B is inserted through the opening 34 and is brought to rest upon the jaw ends 46, 48 so that the seal cannot be moved toward the jaws C when the seal abuts the side ledges of the jaw ends 46, 48. The jaw 26 is moved to overlap the jaw 20 as in Fig. 6, and then the handle 32 is rotated to wind the casing A about the jaws C. Meanwhile, as the casing A is tightened, the seal B prevents the contents of casing A from moving through the seal B. In other words, pulling upon one end of the casing A compresses the edible contents of the casing, and when suitable pressure, as limited by the clutch, is applied to the handle 32 so that the contents of the casing are compressed, then the lever 36 is pushed to the position shown in Fig. 9 and the seal B compressed about the casing A. The handle 32 unwinds the end of the casing 10 from the jaws C, the casing A is pulled so that the seal B is removed from the sealing jaws E and a new casing with its seal is inserted to repeat the operation.

Although my invention has been described in considerable detail, such description is intended as being illustrative rather than limiting, since the invention may be variously embodied, and the scope of the invention is to be determined as claimed.

I claim as my invention:

1. A hand operated machine for pressure packing an edible within a casing comprising a pair of rotatable jaws which overlap one another for grasping said casing, a hand operated handle connected to said jaws, a second pair of jaws adjacent said rotatable jaws having means to support a seal through which said casing is pervaded, means on said second pair of jaws to prevent movement of said seal towards said rotatable pair of jaws, and means to compress said second pair of jaws together whereby said seal will be compressed about said casing.

2. The invention of claim 1 wherein said first named pair of jaws includes one semi-cylindrical shaft mounted to rotate, a second semi-cylindrical shaft mounted to slide over and to rotate said first semi-cylindrical shaft.

3. The invention of claim 2 wherein a pair of supports are mounted parallel to one another, each of said supports being adapted to carry one of the said rotatable jaws.

4. The invention of claim 3 including a clutch mechanism for the said rotatable jaws wherein excessive force will not rupture the casing.

5. A hand operated machine for pressure packing an edible within a casing comprising a pair of rotatable jaws which overlap one another for grasping said casing, one of said rotatable jaws having an enlarged cylindrical end, an adjustable friction clutch, a hand operated handle connected to said friction clutch, said friction clutch having a body portion with an internal cylindrical bore embracing said enlarged cylindrical end, said body portion being slotted and having an externally threaded tapered end, a nut screwed upon said threaded tapered end for adjustably tightening said body portion about said enlarged cylindrical end wherein excessive force applied to said handle will not rupture said casing, a second pair of jaws adjacent said rotatable jaws having means to support a seal, said seal being adapted to encircle said casing, means on said second pair of jaws to prevent movement of said seal toward said rotatable pair of jaws, and means to compress said second pair of jaws together whereby said seal will be compressed about said casing.

References Cited in the file of this patent

UNITED STATES PATENTS

| | | |
|---|---|---|
| 1,620,955 | Drohan | Mar. 15, 1927 |
| 2,492,594 | Renouf | Dec. 27, 1949 |
| 2,677,487 | Friedman | May 4, 1954 |